3,113,081
RAISING THE MELTING POINT OF POLYOLEFINS

James L. Lauer, Philadelphia, Pa., assignor to Sun Oil Company, Philadelphia, Pa., a corporation of New Jersey
No Drawing. Filed June 11, 1957, Ser. No. 664,908
9 Claims. (Cl. 204—154)

This invention relates to a process for increasing the melting point and resistance to organic solvents of polyolefins, and more particularly to a process for raising the melting point of low melting polypropylene and polybutene-1 by exposure to a controlled dosage of gamma radiation.

In the polymerization of propylene and butene-1 by the Ziegler technique, it has been the practice to dissolve the monomer in an inert hydrocarbon solvent, and to contact it under agitation, at temperatures of 60° C. to 80° C., with a metal alkyl-metal halide complex catalyst. Suitable catalysts for the reaction include complexes formed by the reaction of a halide of a metal of groups IV, V, and VI with an activator which acts as a strong reducing agent, such as alkyl derivatives of aluminum, zinc, beryllium, chromium, magnesium, sodium, potassium, and lithium. Aluminum triethyl, aluminum triisopropyl, aluminum triisobutyl, and the magnesium and zinc analogues are preferred, but metal alkyls containing up to about 12 carbon atoms in the alkyl groups can be used to good effect. While the metal halide activated by the activator is preferably titanium trichloride, halides of zirconium, hafnium, vanadium, niobium, chromium, molybdenum, or tungsten may also be used. The complex is prepared by slurrying the metal halide and the activator in an inert medium such as n-heptane or isooctane in a mol ratio of from about 1:10 to 10:1, although ratios of 1:1 to 4:1 are preferred. The catalyst complex should be present in the reaction mixture in an amount of from 0.001% to about 0.25%, preferably about 0.1%.

During the polymerization apparently two competing reactions take place. One of these is believed to be a heterogenous catalysis leading to the formation of a high density crystalline isotactic polymer, which catalysis is believed to proceed by attachment of a monomer to a catalyst particle, followed by successive introduction of monomers between the catalyst and the growing polymer chain to produce a polymer which is insoluble in the hydrocarbon solvent. The other reaction is believed to be catalyzed by excess metal alkyl in solution in the solvent, and leads to the formation of an atactic polymer which is soluble in pentane at room temperature. In the case of polypropylene, the polymer insoluble in the hydrocarbon solvent may be further fractionated by treatment with boiling heptane, which dissolves a semi-crystalline polymer, leaving a highly crystalline isotactic polymer with a melting point of about 340° F. The semi-crystalline heptane soluble polymer has a melting point of about 245° F., while the pentane soluble polymer has a melting point of about 170° F. to 180° F. In the case of polybutene-1, the pentane soluble polymer has a melting point of about 280° F., while the entire pentane-insoluble polymer has a melting point in the neighborhood of 350° F.

It is an object of this invention to provide a process for treating polypropylenes and polybutenes having a melting point below about 300° F. to obtain extrudable polymers having melting points in excess of 300° F.

Irradiation of organic materials with ionizing radiation such as gamma rays or electron beams to alter their properties is known to the art. It has been found that irradiation of high molecular weight materials such as paraffin wax and polyethylene will induce a gradual lowering of the melting point until a critical dosage has been given to the material, at which time, it will change into a material which is infusible below its decomposition temperature. Consequently, in the manufacture of heat resistant articles, it has been the practice to form the material into its desired shape, and to then irradiate the material to change it into an infusible substance. This necessarily limits the manufacture of such articles to large manufacturers who can afford the facilities required to irradiate the finished articles, excluding from the field the small plastic fabricator who lacks radiation facilities.

I have now found that, contrary to what might be expected from the behavior of polyethylene, low melting polypropylene and polybutene-1, when subjected to ionizing radiation at dosages up to about $2 \times 10^8$ r.e.p., increase in melting point without becoming infusible, so that a material may be obtained which is adapted for moulding or extrusion in conventional equipment to form heat-resistant articles. As an example of the results which may be obtained by irradiation of powdered polymers at a dosage of $2 \times 10^8$ r.e.p. from a cobalt 60 source, the following data is given.

Table I

| Material Treated | Melting Point | |
|---|---|---|
| | Before Irradiation, ° F. | After Irradiation, ° F. |
| Pentane soluble polypropylene | 170–180 | 395–405 |
| Heptane soluble polypropylene | 245–255 | 445–455 |
| Pentane soluble polybutene-1 | 280–285 | 390–400 |

While the data in the foregoing table is limited to a dosage of $2 \times 10^8$ r.e.p., which dosage yielded polymers of optimum melting point with regard to extrudability and heat resistance, polymers of lower or higher melting point may be obtained by decreasing or increasing the dosage applied to the polymer. It is thus possible by proceeding in accordance with the present invention, to produce a moulding powder which the small fabricator may use to produce plastic articles which are competitive with plastic articles which have been first fabricated and then exposed to radiation.

The invention claimed is:

1. A process for raising the melting point of polymers which comprises exposing a normally solid polymer having a melting range between about 170° F. and about 285° F. selected from the group consisting of atactic polypropylene and atactic polybutene-1 to high energy, ionizing radiation of a dosage of about $2 \times 10^8$ r.e.p. and recovering a polymer having a melting range higher than that of the unirradiated polymer.

2. The process according to claim 1 in which the polymer is polypropylene.

3. The process according to claim 1 in which the polymer is polybutene-1.

4. A process for raising the melting range of polymers which comprises exposing a normally solid polymer having a melting range between about 170° F. and about 285° F. selected from the group consisting of atactic polypropylene and atactic polybutene-1 to a gamma radiation dosage of about $2 \times 10^8$ r.e.p. and recovering a polymer having a melting range higher than that of the unirradiated polymer.

5. The process according to claim 4 in which the polymer is polypropylene.

6. The process according to claim 4 in which the polymer is polybutene-1.

7. A process for raising the melting range of polymers which comprises exposing a normally solid polymer having a melting range between about 170° F. and about 285° F. selected from the group consisting of atactic polypropylene and atactic polybutene-1 to an electron beam radiation dosage of about $2 \times 10^8$ r.e.p., and recovering a polymer having a melting range higher than that of the unirradiated polymer.

8. The process according to claim 7 in which the polymer is polypropylene.

9. The process according to claim 7 in which the polymer is polybutene-1.

References Cited in the file of this patent

UNITED STATES PATENTS 2,948,666    Lawton _____ Aug. 9, 1960

FOREIGN PATENTS 759,702    Great Britain _____ Oct. 24, 1956

OTHER REFERENCES

Miller et al.: "J. Poly. Sci.," volume 14, pages 503–504, November 1954.

Charlesby: Proc. Roy. Soc. (London), volume 222A, pages 60–74, February 23, 1954.

Charlesby: "Nucleonics," volume 12, No. 6, pages 18–25, June 1954.

Charlesby: "Radiation Research," pages 96–107, February 1955.